United States Patent [19]

Seoung et al.

[11] Patent Number: 5,666,034
[45] Date of Patent: Sep. 9, 1997

[54] METHOD FOR CONTROLLING VELOCITY OF A ROTARY MOTOR AND AN APPARATUS THEREFOR

[75] Inventors: Gan-soo Seoung; Young-hun Kim; In-jung Ha, all of Seoul, Rep. of Korea

[73] Assignee: Samsung Electronics Co., Ltd., Kyungki-Do, Rep. of Korea

[21] Appl. No.: 675,623

[22] Filed: Jul. 3, 1996

[30] Foreign Application Priority Data

Jul. 4, 1995 [KR] Rep. of Korea ............ 95-19515

[51] Int. Cl.$^6$ .................. B65H 59/38; G11B 15/43
[52] U.S. Cl. .................. 318/6; 318/561; 318/609; 318/610; 360/73.04; 360/71; 242/334.2; 242/334.6
[58] Field of Search .................. 318/6–16, 560–636; 388/800–809; 360/73.08, 71, 73.04, 73.05, 77.13, 77.16, 73.01, 73.07, 73.09, 73.11, 73.12, 73.14, 74.2, 74.3, 74.4; 242/334.2, 334.6, 190, 189, 75

[56] References Cited

U.S. PATENT DOCUMENTS 5,395,066 3/1995 Yokoyama et al. ............ 242/334.2
5,481,417 1/1996 Yokoyama et al. ............ 360/73.08
5,491,594 2/1996 Yamamoto et al. ............ 360/73.04

*Primary Examiner*—Paul Ip
*Attorney, Agent, or Firm*—Sughrue, Mion, Zinn, Macpeak & Seas

[57] ABSTRACT

A velocity control method for a rotary motor and an apparatus adopting the same estimates and corrects a disturbance applied to the rotary motor to improve a velocity control characteristic. The disturbance is expressed as a function of an angular velocity and an angular position via a simple calculation process. The velocity control apparatus includes a learning compensator for receiving a velocity command, angular position information and the output of a velocity controller and correcting an effect of the disturbance which is expressed as a function of the angular velocity and the angular position, in addition to a general velocity control loop of a rotary motor composed of a velocity controller, a current controller, a motor and a velocity measuring unit. The learning compensator stores one period of the output of the velocity controller at a steady state of the velocity control loop and obtains a correction value using the stored value and the previous output value. The correction value obtained in the learning compensator is stored in advance and velocity control is performed using the stored value.

9 Claims, 3 Drawing Sheets

METHOD FOR CONTROLLING VELOCITY OF A ROTARY MOTOR AND AN APPARATUS THEREFOR

BACKGROUND OF THE INVENTION

1. Field of the Invention

The present invention relates to velocity control of a rotary motor contained in a video cassette recorder (VCR), and more particularly, to a velocity control method for a rotary motor and an apparatus adopting the same, in which a disturbance applied to the rotary motor is estimated and corrected to improve a velocity control characteristic.

2. Description of the Related Art

Since disturbances exist in controlling motors, accurate motor control is difficult to achieve in practice and a control error is generated. Therefore, a VCR (Video Cassette Recorder) driven by a motor cannot perform accurately. Thus, disturbance is removed by estimating a torque of the disturbance of the motor by means of an observer. A control theory of suppressing such a load disturbance is being studied. One example is shown in FIG. 1.

FIG. 1 is a block diagram showing a conventional velocity control apparatus of a rotary motor having a disturbance. The apparatus of FIG. 1 is disclosed in a paper entitled, "Autocompensation of Torque Ripple of Direct Drive Motor by Torque Observer" by Nobuyuki Matsui, Tatsuo Makino, and Hirokazu Satoh (IEEE Trans. on Industry Applications, Vol. 29, No. 1, January/February 1993, pp. 187–194). In FIG. 1, a first adder A1 receives a velocity command $\omega^*_m$ as a reference input and an angular velocity $\omega_m$ fed back from a motor 15 and obtains a difference $\omega^*_m - \omega_m$. The difference $\omega^*_m - \omega_m$ is input to a velocity controller 11. The velocity controller 11 outputs a current command $i_v^*$ to control a rotational velocity of the motor 15 according to the input difference $\omega^*_m - \omega_m$. The current command $i_v^*$ is input to a second adder A2. The second adder A2 adds the current command $i_v^*$ applied from the velocity controller 11 and a disturbance removal command $i_L^*$ and obtains a corrected current command i*. The disturbance removal command $i_L^*$ is obtained by multiplying an estimation of load disturbance torque $\tau_L(i)$ estimated in a torque observer 17 which receives an angular velocity $\omega_m$ fed back from the motor 15 and an actual current i by a transfer function $K_T^{-1}$. Here, values without the superscript * are actual values and values with the superscript * are command values.

Meanwhile, the corrected current command i* is input to a current controller 13. The current controller 13 expressed as the transfer function $K_T$ supplies a torque command $\tau^*$ to the motor 15 in order to control a rotational velocity of the motor 15 in response to the corrected current command i*. The motor 15 rotates at a speed corresponding to the torque command $\tau^*$ of the current controller 13.

However, in controlling a motor, factors varying a control quantity are generated according to peripheral conditions. Such factors are called disturbances $T_L$ which render accurate velocity control difficult to obtain. Thus, a good velocity characteristic can be obtained only when an effect of the disturbance is removed. The torque observer 17 which generates an estimate of the actual disturbance $T_L$ applied to the motor 15 obtains an estimated load disturbance torque $\tau_L(i)$ according to the following relationships (1) under the assumption that the disturbance is varied sufficiently slowly.

$$\hat{\tau}_L(i) = \epsilon(i) + L\dot{\omega}_m(i) \quad (1)$$

$$\epsilon(i+1) = \hat{A}\epsilon(i) + \hat{b}i_q(i) + \hat{K}\omega_m(i)$$

$$\hat{A} = 1 + LT_s/J_n, \hat{b} = -LK_{Tn}T_s/J$$

$$\hat{K} = L(L+D_n)T_s/J_n$$

Jn, Dn and $K_{Tn}$ are nominal values with respect to an inertial moment J, a damping factor D and a torque constant $K_T$. L, which is smaller than zero is an observer gain, $\epsilon$ is a random variable, $\tau_L$ is an observer output, and $T_s$ is a sampling period.

The above relationships (1) can be combined to yield the following relationship (2).

$$\hat{\tau}_L(S) = \frac{1}{1+ST} \tau_L(S) \quad (2)$$

Here, $\tau_L$ is an actual load disturbance torque, $\hat{\tau}_L$ is an estimated load disturbance torque and s is a Laplacian operator. In this case, $T = -T_s/\ln(1+LT_s/J_n)$ and $1/(1+ST)$ serves as a low-pass filter. Values without a subscript n are actual values and values with the subscript n are nominal values which are designed to be close to the actual values.

Thus, if the actual load disturbance torque $\tau_L$ is slowly varied, it approximates the estimated load disturbance torque $\hat{\tau}_L$ to completely remove the load disturbance $T_L$.

As described above, the conventional method of removing the load disturbance by estimating the load disturbance torque of the motor requires a large calculation time due to the complex equations and thus, there are substantial problems associated with implementing it into hardware. Since a bandwidth of the low-pass filter $1/(1+ST)$ becomes large to follow up the fast varying disturbances, the observer gain L must be large accordingly. The gain cannot be enlarged without generating limitations in an actual implementation, and the disturbance is estimated with respect to time. As a result, a continuous estimation operation should be performed during the operation of a closed loop with respect to the velocity control of the rotary motor. This requires a great deal of calculation and thus is difficult to implement known hardware.

SUMMARY OF THE INVENTION

To solve the above problem, it is an object of the present invention to provide a velocity control method for a rotary motor, which stores values for compensating an effect of disturbance expressed as a function of an angular velocity and an angular position via a learning function and compensates for the disturbance using the stored values.

It is another object of the present invention to provide a velocity control apparatus for a rotary motor which controls a rotary motor by estimating and compensating for a disturbance via a repetitive learning control method.

To accomplish the above object of the present invention, is a velocity control method for a rotary motor comprises the steps of:

(a) obtaining a velocity error by comparing an input reference velocity with an actual velocity detected from the motor;

(b) receiving the velocity error and outputting a current command for controlling the rotational velocity of the motor;

(c) receiving the input reference velocity, the current command and the angular position and outputting a disturbance correction value for correcting an effect of the disturbance expressed as a function of an angular position and an angular velocity applied to the motor via a repetitive learning process;

(d) obtaining a corrected current command by adding the current command and the disturbance correction value;

(e) receiving the corrected current command and outputting a torque command to the motor; and (f) detecting a present velocity of the rotating motor according to the torque command.

Another object of the present invention can be accomplished by providing a velocity control apparatus for a rotary motor comprising:

velocity measuring means for obtaining a velocity error by comparing an input reference velocity with an actual velocity detected from the motor;

a velocity controller for receiving the velocity error and outputting a current command for controlling the rotational velocity of the motor;

a learning compensator for receiving the input reference velocity and the current command output from the velocity controller and the angular position and for correcting an effect of the disturbance expressed as a function of an angular position and an angular velocity applied to the motor via a repetitive learning process;

current command compensating means for obtaining a corrected current command by adding the current command output from the velocity controller and the disturbance correction value obtained in the learning compensator; and a current controller for receiving the corrected current command and outputting a torque command to the motor.

BRIEF DESCRIPTION OF THE DRAWINGS

The preferred embodiment of the invention is described with reference to the drawings wherein.

DETAILED DESCRIPTION OF THE PREFERRED EMBODIMENT

A preferred embodiment of the present invention will be described below in more detail with reference to the accompanying drawings.

Figure 1:
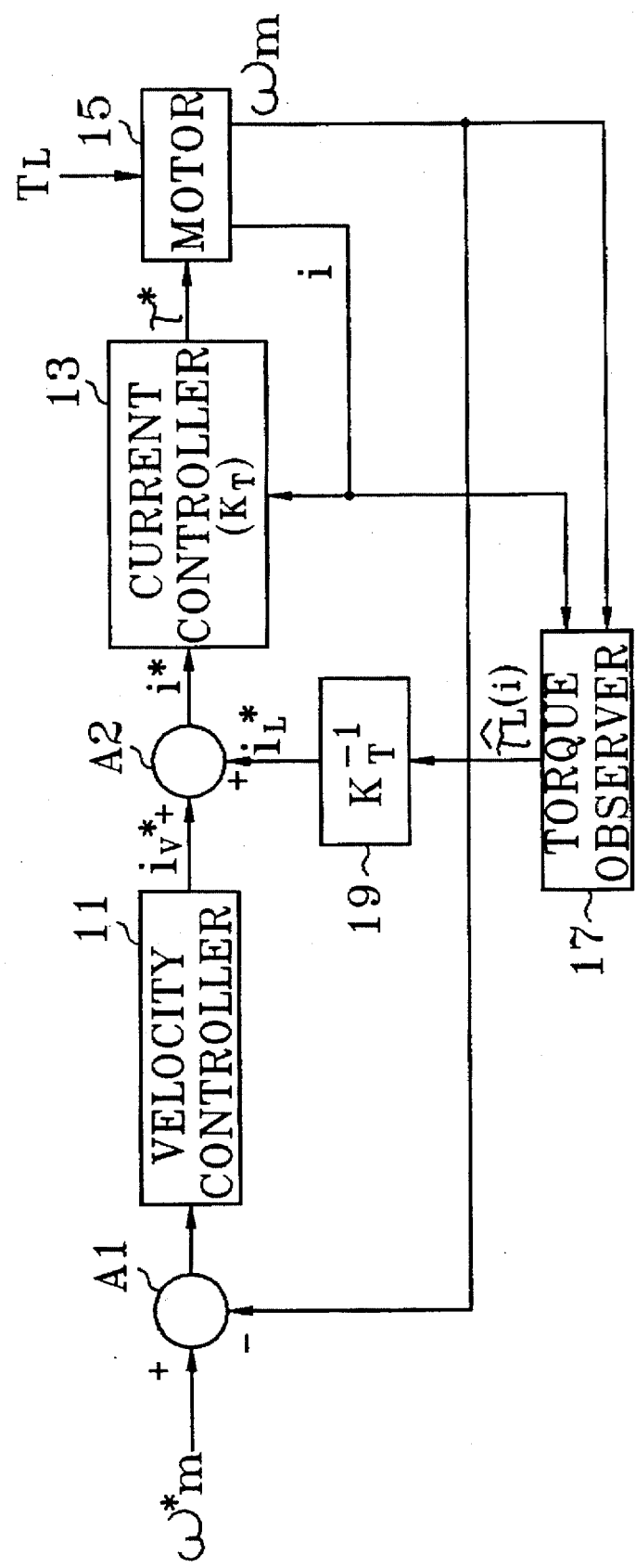
FIG. 1 is a block diagram of a conventional velocity control apparatus for a rotary motor having a disturbance.
Figure 2:
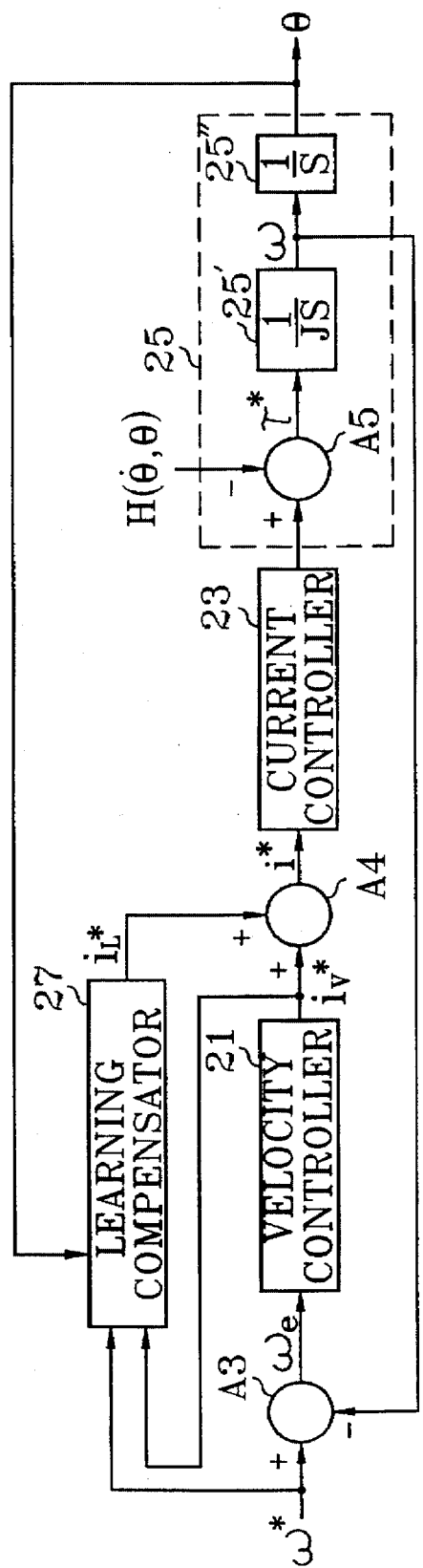
FIG. 2 is a block diagram of a velocity control apparatus for a rotary motor having a disturbance according to a preferred embodiment of the present invention.

The preferred embodiment illustrated in FIG. 2 is similar to the conventional apparatus. However, as illustrated in FIG. 2, a learning compensator 27 is used in the preferred embodiment instead of a torque observer. The learning compensator 27 receives a velocity command $\omega^*$, the output of a velocity controller 21 and an angular position $\theta$ fed back from an encoder 25" or the like coupled to the motor 25 to produce an output $i_L^*$ for correcting an effect of the disturbance.

A first adder A3 compares a current angular velocity $\theta$ detected from a motor 25 with an input reference angular velocity $\omega^*$ and obtains an angular velocity error $\omega_c$. The velocity error $\omega_c$ is input to a velocity controller 21. The velocity controller 11 maintains the following relationship (3) between the torque and the angular velocity of the motor 25.

$$J\frac{d\omega}{dt} + T_L = T = K_T i \qquad (3)$$

Here, J is the moment of inertia, $\omega$ is the number of the rotation, $T_L$ is a torque of a load, T is an input torque, $K_T$ is a torque constant that can be obtained experimentally or empirically, and i is a current in a motor coil.

If a load torque $T_L$ is zero, the motor has no load disturbance. Thus, an excellent velocity control characteristic can be obtained using a general velocity controller. If there is a load torque $T_L$, the velocity control characteristic is lowered. In the preferred embodiment, a learning compensator 27 is used in which an effect of the disturbance $H(\theta,\dot\theta)$ with respect to a load disturbance torque $T_L(H(\theta,\dot\theta))$ expressed as a function of an angular position $\theta$ and an angular velocity $\dot\theta$ (i.e.

$$\frac{d\theta}{dt})$$

is removed via a repetitive learning process. The learning compensator 27 receives the output $i_v^*$ of the velocity controller 27, the velocity command $\omega^*$ and the angular position $\theta$ and produces the output $i_L^*$ for removing an effect of the disturbance $H(\theta,\dot\theta)$. Here, the output $i_L$ is a periodic function having a period T of $2\pi/\omega^*$ with respect to the velocity command $\omega^*$ and the time, and is defined by the following relationship (4). In case of constant velocity control, $\theta=\omega^*t$.

$$i_{L(K)}(\omega^*,\theta)=i_{L(K-1)}(\omega^*,\theta)+mZ_{(K-1)}(\theta) \qquad (4)$$

Here, m<Kp, and Kp is a gain of a velocity controller which can be easily determined in a known manner for each particular controller. Also, m is a repetitive learning gain, $Z_{(k-1)}$ is obtained by sampling an output of the velocity controller during a normal (undisturbed) state for a period T.

The above-defined periodic function represents convergence to a value for removing the disturbance $H(\theta, \dot\theta)$. As a result of simulation, the disturbance $H(\theta, \dot\theta)$ is removed from the output $i_L^*$ of the learning compensator 27 after a few iterations of a repetitive learning process. The operation of the learning compensator 27 will be described in more detail with reference to FIG. 3 which is a flow chart describing the function of the learning compensator 27.

Figure 3:
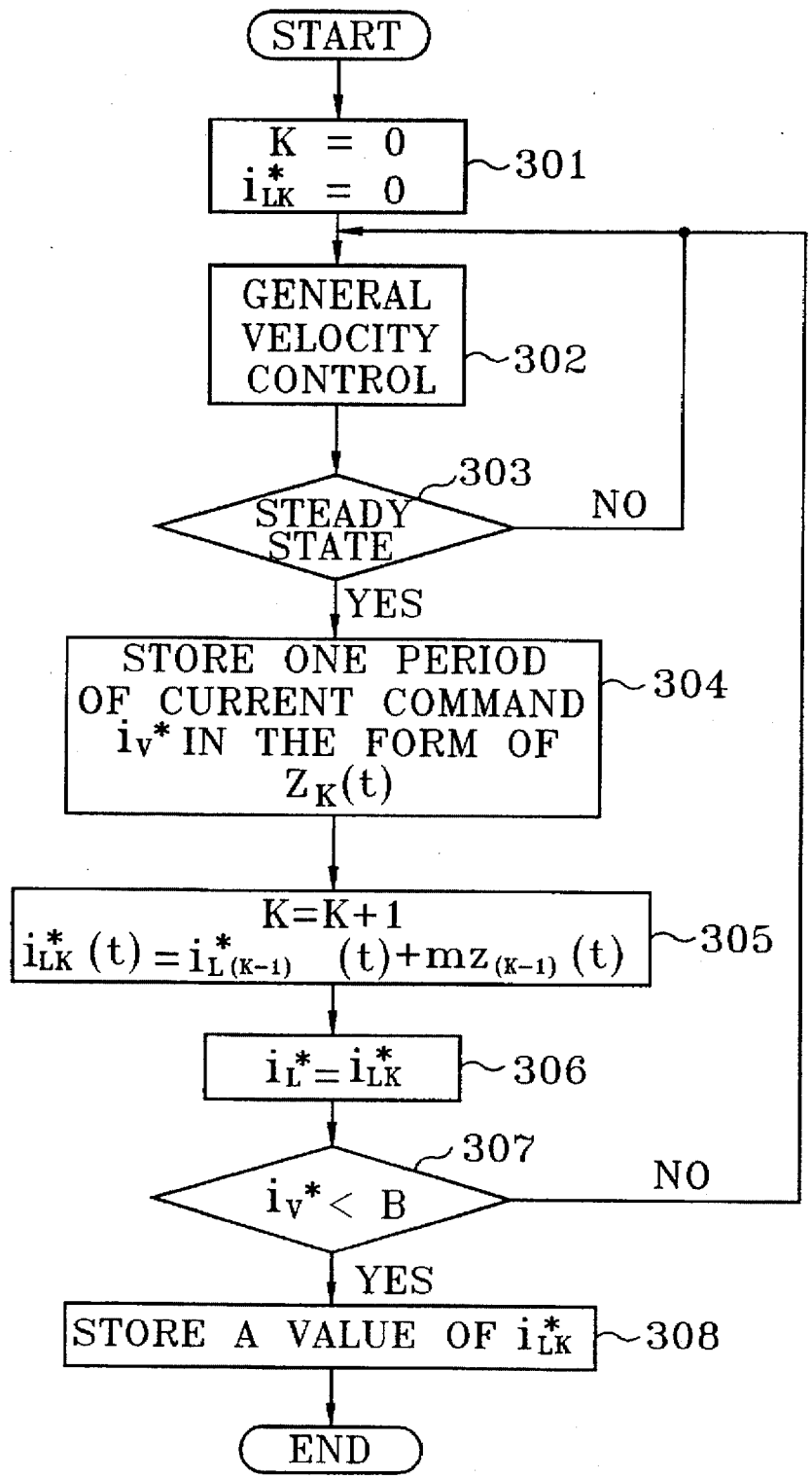
FIG. 3 is a flow chart diagram for explaining the operation of the learning compensator in the velocity control apparatus of FIG. 2.

In FIG. 3, when compensation starts, the learning compensator 27 initializes the number K of the repetitive learning to be set at zero at the start, and initializes the output $i_{LK}^*$, which is a disturbance correction value, to be set to zero, that is, K=0 and $i_{LK}^*=0$ (step 301). Then, a general motor velocity control is performed only according to an existing velocity control loop in a known manner (step 302). The general velocity control is performed until the velocity achieves a normal state (steady state) (step 303). If the angular velocity of the motor being a controlled reaches a normal state (step 303) via the velocity control step 302, the learning compensator 27 produces the current command $i_v^*$ applied from the velocity controller 21 with respect to the periodic disturbance into a periodic current command, since it is a periodic function which is expressed as a constant angular velocity $\theta$ and a disturbance $H(\theta, \dot\theta)$ expressed as a function of the angular position $\theta$ (step 304). Also, one period of the periodic current command $i_v^*$ is stored in the form of $Z_K$, that is, ($Z_K(t)$, t∈[0, T]) (step 304). Then, the learning compensator 27 increases the repetitive learning iteration K by one, that is, K=K+1 and produces an output for correcting an effect of the disturbance using the following relationship (5) (step 305).

$$i*_{LK}(t)=i*_{L(K-1)}(t)+mZ_{(K-1)}(t) \tag{5}$$

That is, the disturbance correction value $i*_{LK}$ is obtained by the repetitive learning step by adding a value, obtained by multiplying one periodic value $Z_{(K-1)}$ of the periodic current command stored via step 304 by the repetitive learning gain m, to the disturbance correction value $i*_{L(K-1)}$ obtained in the previous repetitive learning step. The learning compensator 27 takes the output $i*_{LK}$ of the above relationship (5) as a final output $i*_L$ and outputs the final output to a second adder A4, that is $i*_L=i*_{LK}$ (step 306).

As illustrated in FIG. 2, the second adder A4 adds the current command $i_v*$ applied from the velocity controller 21 and the disturbance correction command $i_L*$ to output the corrected current command i*. The current command i* is input to the current controller 23. The current controller 23 outputs a torque command to the motor 25 in response to the input current command i*. A third adder A5 in the motor 25 subtracts the applied disturbance from the torque command applied from the current controller 23, to output a corrected torque command τ*. The velocity of the motor 25' expressed as a transfer function 1/JS is controlled according to the torque command τ*. The angular velocity ω output from the motor 25 as a result of the velocity control is fed back to the first adder A3. A velocity error $ω_c$ is obtained by subtracting the angular velocity ω from the input velocity command ω*. The velocity error $ω_c$ is input to the velocity controller 21. The velocity controller 21 outputs the current command $i_v*$ for controlling the rotational velocity of the motor 25 according to the input velocity error $ω_c$. The current command $i_v*$ is input to the learning compensator 27. The angular velocity ω is output as the angular position θ via an encoder 25" or the like expressed as a transfer function of 1/S, and is fed back to the learning compensator 27.

Returning to FIG. 3, the learning compensator 27 which stores the disturbance compensation value obtained by the K-th learning compares the current command $i_v*$ input from the velocity controller 21 with a predetermined threshold value B, and judges whether the disturbance applied to the motor 25 is sufficiently compensated for (step 307). B can be set as desired based on the required accuracy of the apparatus. In the disturbance compensation judgement step 307, if the current command $i_v*$ input from the velocity controller 21 is smaller than the predetermined threshold value B, that is, $i_v*<B$, the learning compensator 27 returns step 302 to perform a general velocity control until it the motor 25 reaches a normal state. If the normal state is reached, the learning compensator 27 repetitively performs processes of storing a value for each period with respect to the output $i_v*$ of the velocity controller 21 and compensating for the disturbance of the motor.

The learning compensator 27 recognizes that sufficient compensation is performed if the current command $i_v*$ input from the velocity controller 21 is smaller than the predetermined threshold value B, and stores a periodic function $i_v*$ with respect to time as a final fixed correction value with respect to the disturbance (step 308). Then, the learning compensator 27 receives the input reference velocity ω* and the angular position θ, and outputs the disturbance correction value stored in an address in a memory that corresponds to the angular position and the reference velocity.

As a result, the velocity control is performed by simply adding the prestored correction value in the learning compensator 27 to the output $i_v*$ of the velocity controller 21, to thereby enable an efficient velocity control.

As described above, the velocity control method for a rotary motor and the apparatus thereof according to the present invention stores predetermined correction values for correcting an effect of the disturbance, and performs a velocity control using the stored predetermined correction values. Accordingly, a simple and efficient velocity control can be performed. The components can be hardwired logic or a general purpose computer programmed accordingly.

While a preferred embodiment of the invention has been described herein, it will apparent that numerous modifications may be made thereto without departing from the spirit and scope of the invention as defined the appended claims.

What is claimed is:

1. A velocity control apparatus for a rotary motor, the velocity control apparatus comprising:

velocity measuring means for obtaining a velocity error by comparing an input reference angular velocity with an actual angular velocity detected from the motor;

a velocity controller for receiving the velocity error and outputting a current command for controlling the angular velocity of the motor;

a learning compensator for receiving the input reference angular velocity and the current command output from the velocity controller and an angular position of the motor and for correcting an effect of the disturbance expressed as a function of the angular position and the angular velocity of the motor via a plurality of repetitive learning steps;

current command compensating means for obtaining a corrected current command by adding the current command output from the velocity controller and the disturbance correction value obtained in the learning compensator; and a current controller for receiving the corrected current command and outputting a torque command to the motor.

2. The velocity control apparatus for a rotary motor according to claim 1, wherein said learning compensator produces a periodic current command with respect to the periodic disturbance of the motor using the current command output from said velocity controller when the motor is in a steady state, and obtains a current disturbance correction value using one periodic value of the periodic current command and the disturbance correction value obtained in the previous learning one of the repetitive learning steps.

3. The velocity control apparatus for a rotary motor according to claim 2, wherein said learning compensator outputs the disturbance correction value based on the following relationship, $$i*_{LK}(t)=i*_{L(K-1)}(t)+mZ_{(K-1)}(t)$$

wherein $i*_{LK}$ is the disturbance correction value obtained in the Kth repetitive learning step and becomes the output of the learning compensator, $i*_{L(K-1)}$ is the disturbance correction value obtained in the (K−1)th repetitive learning step, m is the repetitive learning gain and m<1, $Z_{(K-1)}$ is one periodic value of the current command which is a periodic function output from the velocity controller in the (K−1)th repetitive learning step.

4. The velocity control apparatus for a rotary motor according to claim 3, wherein said learning compensator compares the current command output from said velocity controller with a predetermined threshold value and judges whether sufficient compensation is performed with respect to the disturbance applied to the motor, and if it is judged that sufficient compensation is performed, the disturbance correction value is stored and the subsequent disturbance correction is performed using the stored disturbance correction value in the following velocity control.

5. The velocity control apparatus for a rotary motor according to claim 4, wherein said learning compensator obtains a new disturbance correction value via the repetitive learning steps if it is judged that sufficient compensation has not been performed with respect to the disturbance applied to the motor.

6. The velocity control apparatus for a rotary motor according to claim 4, wherein said learning compensator receives the input reference velocity and the angular position of the motor as addresses, and outputs the disturbance correction value stored at the corresponding addresses.

7. A velocity control method for a rotary motor, the velocity control method comprising the steps of:

(a) obtaining a velocity error by comparing an input reference angular velocity with an actual angular velocity detected from the motor;

(b) receiving the velocity error and outputting a current command for controlling the angular velocity of the motor;

(c) receiving the input reference angular velocity, the current command and the angular position of the motor and outputting a disturbance correction value for correcting an effect of the disturbance expressed as a function of the angular position and the angular velocity of the motor via a plurality of repetitive learning steps;

(d) obtaining a corrected current command by adding the current command and the disturbance correction value;

(e) receiving the corrected current command and outputting a torque command to the motor; and (f) detecting a present angular velocity of the rotating motor according to the torque command.

8. The velocity control method for a rotary motor according to claim 7, wherein said repetitive learning steps comprise the sub-steps of:

(c1) initializing the repetitive learning iteration to zero and the disturbance correction value to zero at the start of the repetitive learning steps;

(c2) producing a periodic current command using the current command with respect to the disturbance which is a periodic function expressed as only a function of angular position with the constant angular velocity if the velocity control reaches a steady state in step (b);

(c3) storing one period of the periodic current command;

(c4) increasing the repetitive learning iteration by one;

(c5) obtaining the current disturbance correction value according to the repetitive learning step by adding the one periodic value of the periodic current command to the disturbance correction value obtained in the corresponding repetitive learning step;

(c6) judging whether the disturbance is sufficiently compensated for by comparing the current command in step (b) with a predetermined threshold value at the time of correcting the disturbance applied to the motor with the obtained disturbance correction value;

(c7) storing the disturbance correction value if it is judged that the disturbance has been sufficiently compensated for in sub-step (c6); and (c8) if the disturbance has not been sufficiently compensated for in sub-step (c6), repeating the repetitive learning steps until the disturbance will be sufficiently compensated for to thereby obtain the disturbance correction value.

9. The velocity control method for a rotary motor according to claim 8, wherein said repetitive learning steps correct the disturbance using the stored disturbance correction values.

* * * * *